(12) United States Patent
Kieley

(10) Patent No.: US 9,856,895 B2
(45) Date of Patent: Jan. 2, 2018

(54) REVERSIBLE UNIVERSAL SUPPORT FOR A DISPLAY UNIT

(71) Applicant: Sean Kieley, Montreal (CA)

(72) Inventor: Sean Kieley, Montreal (CA)

( * ) Notice: Subject to any disclaimer, the term of this patent is extended or adjusted under 35 U.S.C. 154(b) by 306 days.

(21) Appl. No.: 14/491,188

(22) Filed: Sep. 19, 2014

(65) Prior Publication Data
US 2015/0136820 A1    May 21, 2015

Related U.S. Application Data

(60) Provisional application No. 61/905,164, filed on Nov. 16, 2013.

(51) Int. Cl.
| F16B 2/12 | (2006.01) |
| F16M 11/04 | (2006.01) |
| F16M 11/10 | (2006.01) |
| F16M 11/38 | (2006.01) |
| F16M 13/00 | (2006.01) |
| F16M 13/02 | (2006.01) |
| F16M 13/04 | (2006.01) |

(52) U.S. Cl.
CPC .............. *F16B 2/12* (2013.01); *F16M 11/041* (2013.01); *F16M 11/10* (2013.01); *F16M 11/38* (2013.01); *F16M 13/00* (2013.01); *F16M 13/022* (2013.01); *F16M 13/04* (2013.01)

(58) Field of Classification Search
CPC ........ F16M 13/04; F16M 13/00; F16M 11/24; A45F 2200/0516; A45F 2200/0525
See application file for complete search history.

(56) References Cited

U.S. PATENT DOCUMENTS

| 4,715,293 | A  | * | 12/1987 | Cobbs | A47B 23/002 |
| | | | | | 108/43 |
| 8,262,047 | B2 | * | 9/2012 | Lindblad | F16M 11/04 |
| | | | | | 248/162.1 |
| 9,103,491 | B2 | * | 8/2015 | Mak | F16M 13/04 |
| 2007/0164987 | A1 | * | 7/2007 | Graham | A45F 5/00 |
| | | | | | 345/156 |
| 2010/0025444 | A1 | * | 2/2010 | Tipton | A45F 5/00 |
| | | | | | 224/576 |
| 2011/0315733 | A1 | * | 12/2011 | White | A45F 5/00 |
| | | | | | 224/600 |
| 2012/0170194 | A1 | * | 7/2012 | Lord | G06F 1/1632 |
| | | | | | 361/679.02 |
| 2013/0214022 | A1 | * | 8/2013 | Harvey | F16M 11/041 |
| | | | | | 224/623 |
| 2014/0085814 | A1 | * | 3/2014 | Kielland | A45F 3/02 |
| | | | | | 361/679.55 |
| 2015/0124385 | A1 | * | 5/2015 | Mak | F16M 11/08 |
| | | | | | 361/679.03 |

* cited by examiner

*Primary Examiner* — Corey Skurdal
(74) *Attorney, Agent, or Firm* — Intellectual Property Consulting, LLC; Christina Chamberlain

(57) ABSTRACT

The present invention comprises generally a friction hinge to hoist a display unit above a base and suspend it in the air to a unique cantilevered viewing position. The universal support has the shape of the base in an "H" or "I" configuration with angled feet to maximize stability when resting on the chest. The "H" shape is designed to fit well around the user's breasts. The base is reversible around the cantilever arm such that the top surface of the base may either face up or down such that the base may rest against an uneven surface with the top surface of the base facing up and may rest against a flat surface with the top surface of the base facing down.

10 Claims, 22 Drawing Sheets

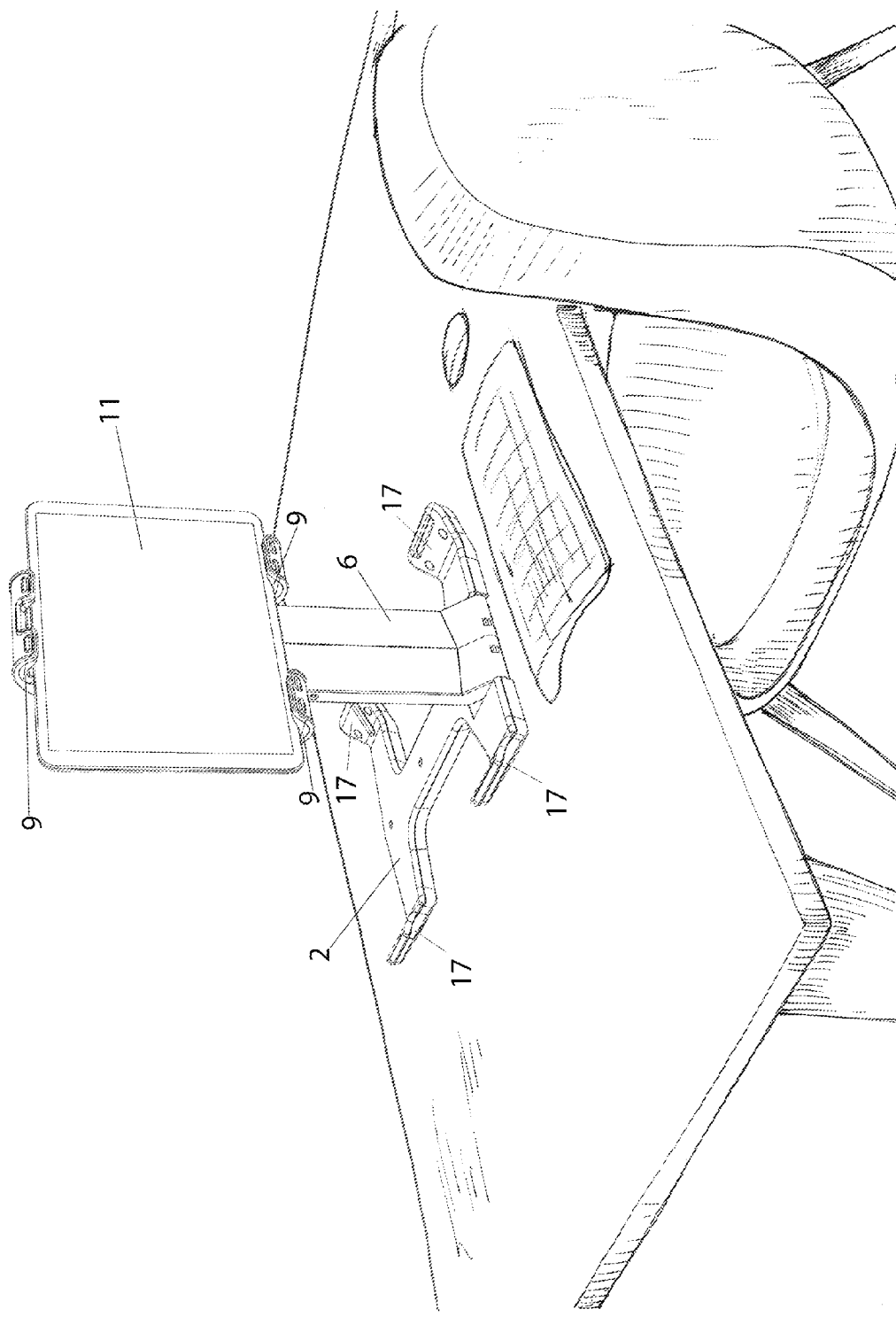

REVERSIBLE UNIVERSAL SUPPORT FOR A DISPLAY UNIT

RELATED APPLICATIONS

This application claims priority to U.S. Provisional Application No. 61/905,164 filed Nov. 16, 2013. The entire contents of the above application are hereby incorporated by reference as though fully set forth herein.

FIELD

The present invention relates to the field of stand and supports. More specifically, the present invention relates to reversible, universal support for display units.

BACKGROUND

With the growing popularity of computer tablets, wireless displays and televisions comes a variety of supports and stands. These stands are generally designed for use with a flat surface such as a table or a desk. However, these devices are often used in very different settings, such as while lying in bed and walking around. As such, there is a need for a more versatile type of support stand for display units.

BRIEF SUMMARY OF THE INVENTION

It is the object of the present invention to address several challenges in previous attempts to provide a versatile universal stand support for display units. The present invention seeks to provide for a support, which is reversible such that it can be used on both flat surfaces as well as uneven surfaces such as a user's lap or torso when in a reclined or upright position. In order to do so, the present invention uses a friction hinge to hoist the display unit above a base and suspends it in the air to a unique cantilevered viewing position. The universal support has the shape of the base in an "H" or "I" configuration with angled feet to maximize stability when resting on the chest. The "H" shape is designed to fit well around breasts. The base is reversible around the cantilever arm such that the top surface of the base may either face up or down such that the base may rest against an uneven surface with the top surface of the base facing up and may rest against a flat surface with the top surface of the base facing down.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 3 is a perspective view of a universal support for a display unit with base member top surface facing down.

DETAILED DESCRIPTION

Figure 1:
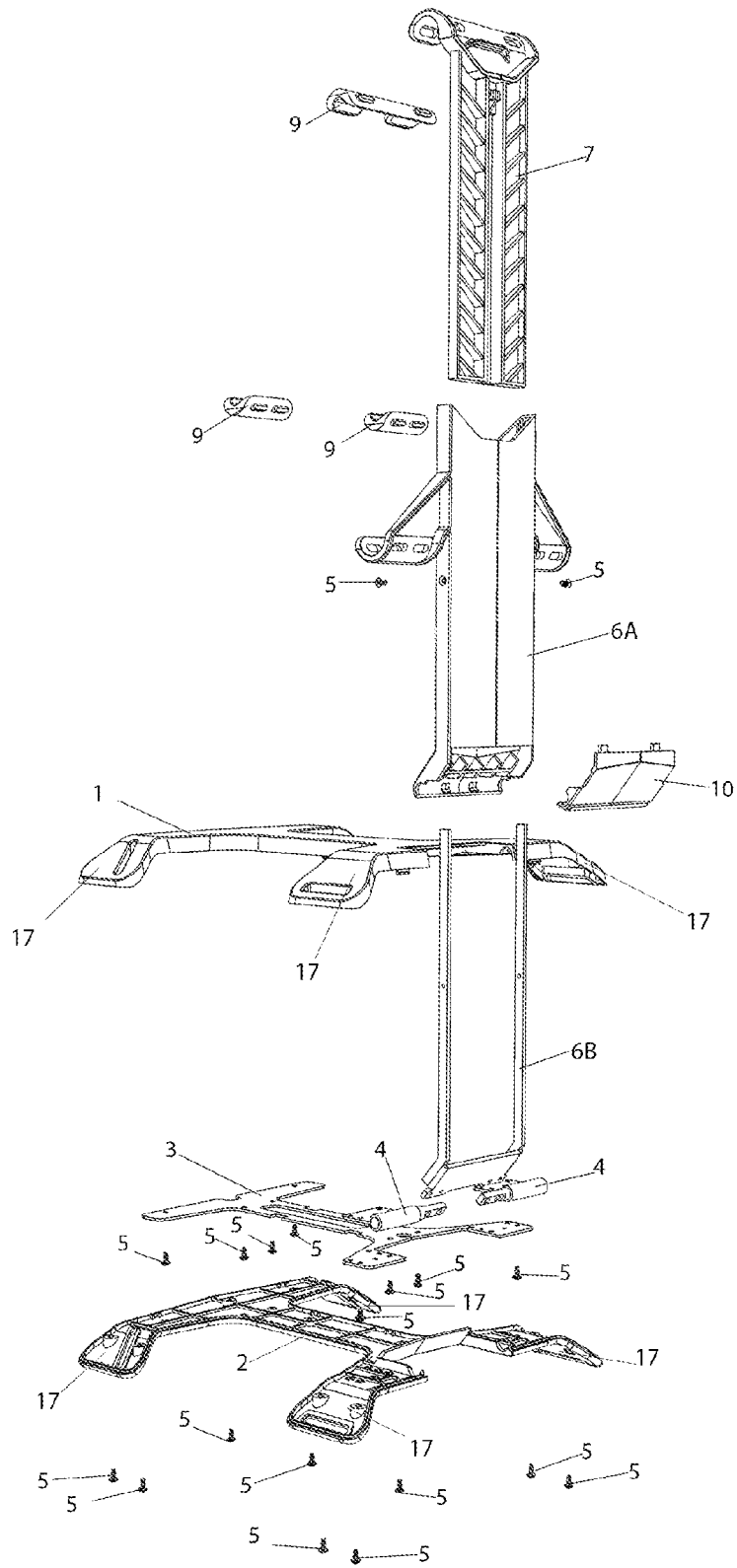
FIG. 1 exploded rear perspective view of universal support for a display unit.

Turning to FIG. 1, a universal support for a display unit has an extensible and rotatable cantilever arm frame 6B that is removably attached to a cover piece 6A to create the rotatable cantilever arm shown as 6 in the remaining figures. The arm frame 6B is connected via friction hinges 4 to an "H" or "I" shaped base. The "H" or "I" shaped base is comprised of a top portion 1, a metal base 3 and bottom portion 2 having a plurality of footings 17 extending downwardly from the bottom portion 2 when the top surface of top portion 1 faces upward. The footings 17 are angled to maximize stability when resting on the chest and the "H" or "I" configuration of the base is designed to fit well around a chest of a user 12, as shown in further detail in FIG. 2. The rotatable cantilever arm 6 is rotatably attachable to the base member using the plurality of friction hinges 4 such that the base member top surface may face up or down, depending on the position of the cantilever arm 6. The cantilever arm 6 may be rotated around the base member up to about 360°. The cantilever arm 6 may be rotated around the base member up to about 315° such that the cantilever arm 6 may be fixed at any point in between 0 and about 315°. An extensible tongue member 7 wherein the extensible tongue member 7 is attachable to the rotatable cantilever arm 6 such that the extensible tongue member 7 is vertically movable and adjustable along the cantilever arm 6. The cantilever arm parts 6A and 6B as well as base parts 1, 2 and 3, respectively, are held in place using a plurality of connectors 5.

Figure 2:
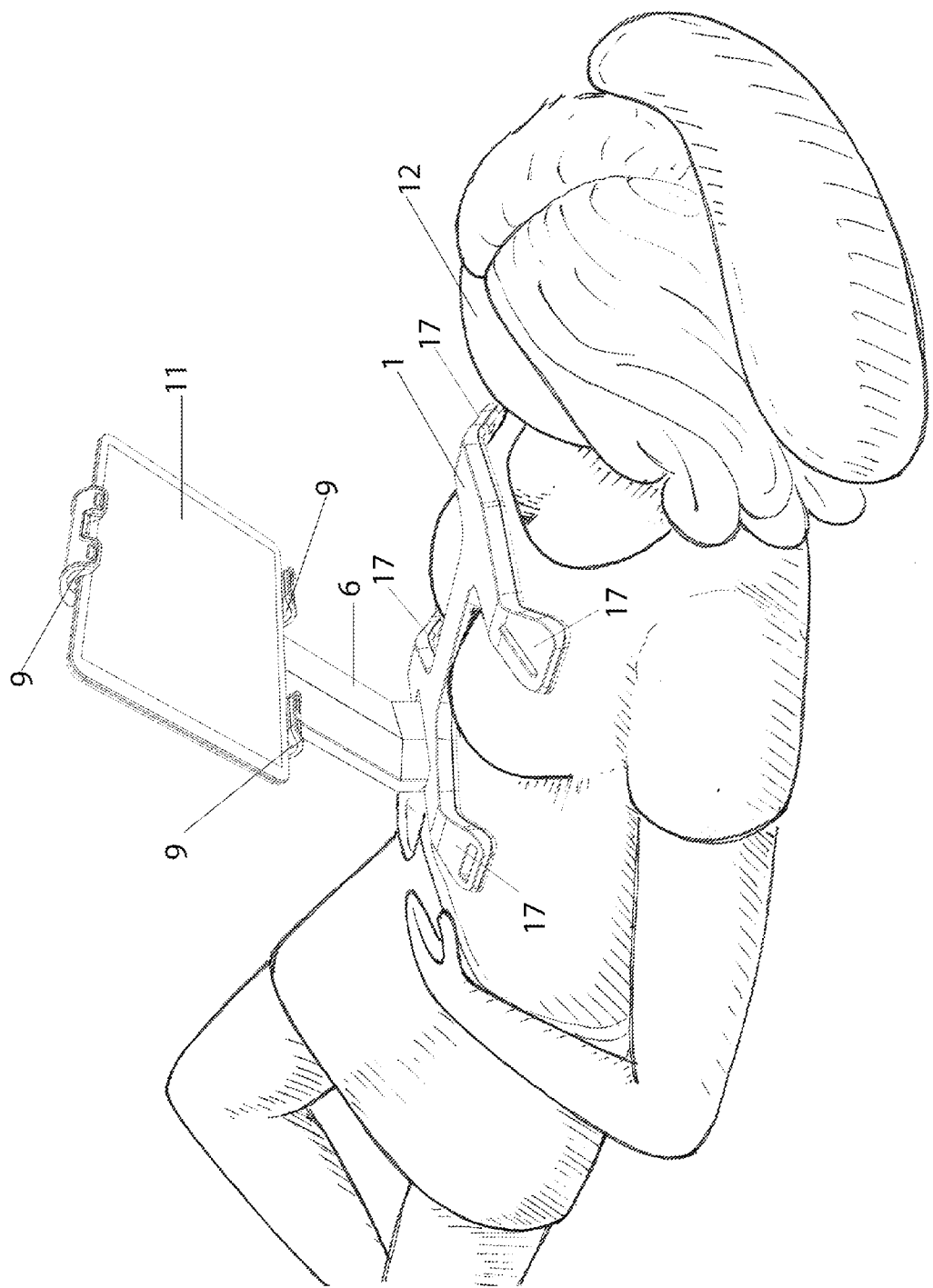
FIG. 2 is a side perspective view of a universal support for a display unit with base member top surface facing up.

Turning to both FIGS. 1 and 2, the tablet 11 is mounted between gripper members 9, with a lower gripper member fixedly attached to the cantilever arm 6 and an upper gripper member fixedly attached to one extremity of a tongue member 7. The top surface of the base 1 faces upward with the footings 17 on the bottom portion 2 of the base facing downward when the user 12 is in a reclined or supine position, as shown in FIG. 2. As shown in FIG. 3, the top surface of the base 1 faces downward with the footings 17 on the bottom portion 2 of the base facing upwards when the holder is used on a flat surface, such as a desktop.

Figure 4A:
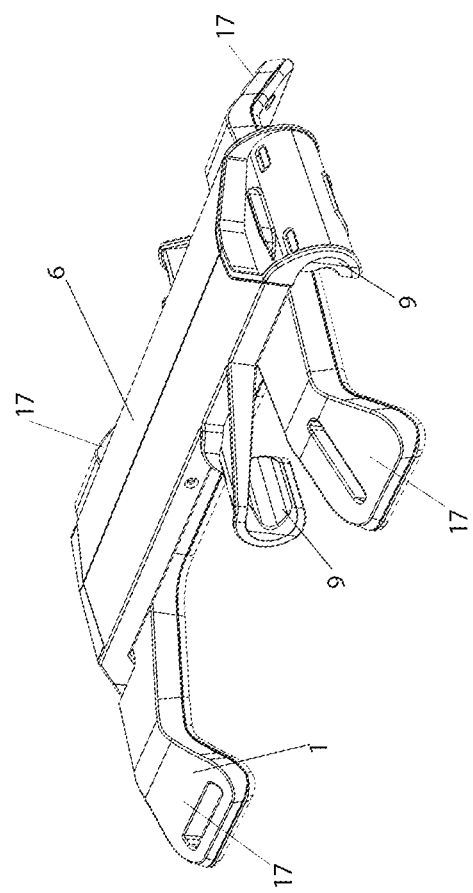
FIG. 4A is a side perspective view of universal support for a display unit in a first closed position.

Turning to FIG. 4A, when the holder is in a storage position, the cantilever arm 6 rotates around the friction hinges (not shown) such that the cantilever arm 6 folds flat against the top surface of the top portion 1 of the base, wherein the top surface of the top portion 1 of the base faces upward with the footings 17 on the bottom portion 2 of the base facing downward.

Figure 4B:
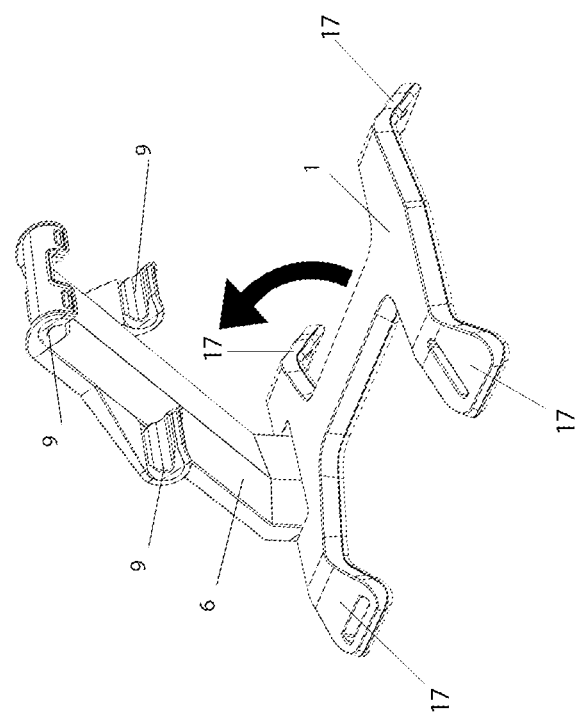
FIG. 4B is a front perspective view of universal support for a display unit in a first alternative viewing position.
Figure 4C:
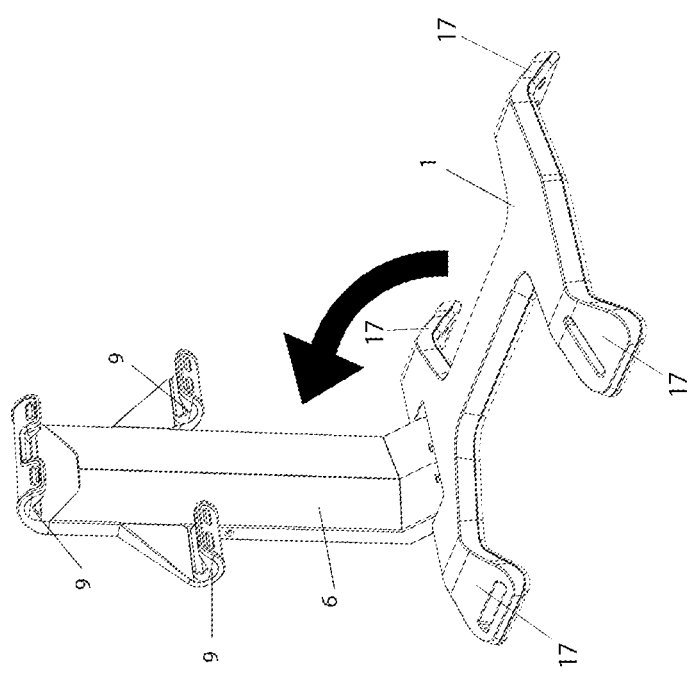
FIG. 4C is a front perspective view of universal support for a display unit in a second alternative viewing position.

Turning to FIGS. 4B and C, when the holder is in a position for use when the user is in a supine or reclined position or on any uneven surface, the cantilever arm 6 rotates around the friction hinges (not shown) such that the cantilever arm 6 is positioned at an angle from about 0 to about 180° relative to the top surface of the top portion 1, wherein the top surface of the top portion 1 of the base faces upward with the footings 17 on the bottom portion 2 of the base facing downward.

Figure 4D:
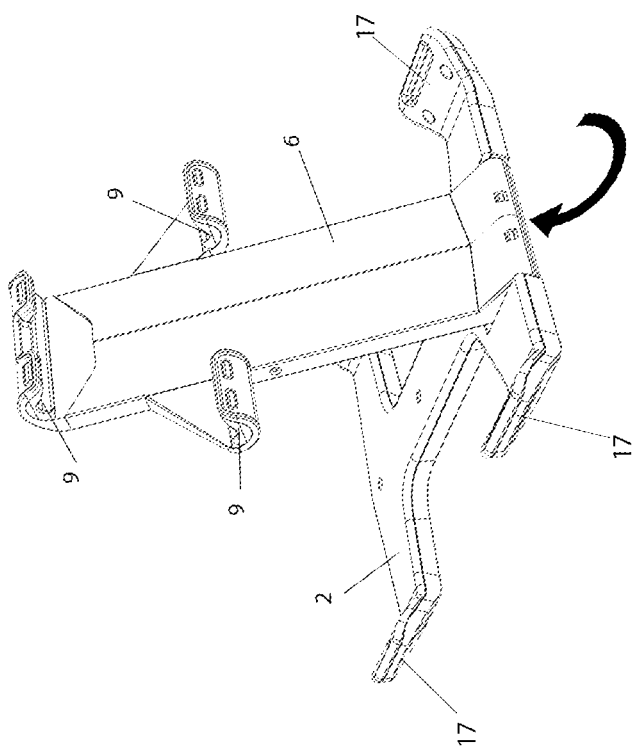
FIG. 4D is a front perspective view of universal support for a display unit in third alternative viewing position.

Turning to FIG. 4D, when the holder is in a position for use on a flat surface, the cantilever arm 6 rotates around the friction hinges (not shown) such that the cantilever arm 6 is positioned to an angle greater than 180° to about 360° relative to the top portion of top surface 1, wherein the top surface of the top portion 1 of the base faces downward with the footings 17 on the bottom portion 2 of the base facing upwards.

Figure 5A:
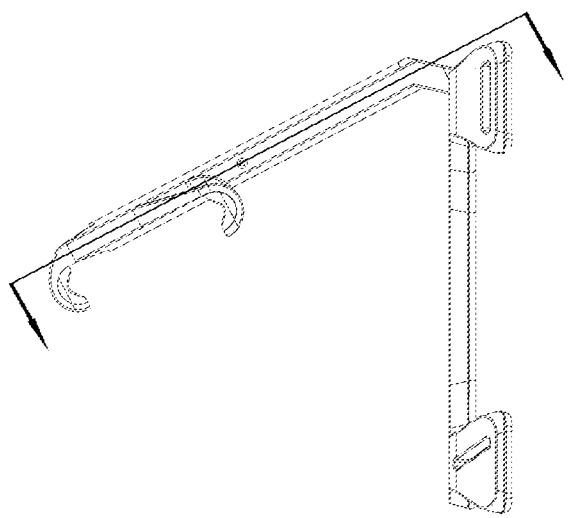
FIG. 5A is a side elevation view of universal support for a display unit in an exemplary viewing position with extensible tongue member refracted. The view is to illustrate section arrows.
Figure 5B:
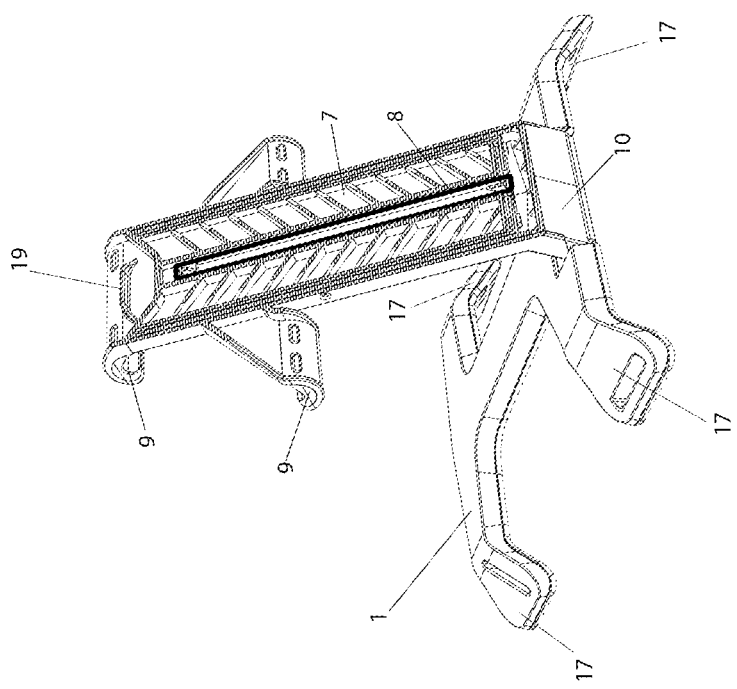
FIG. 5B is a rear perspective 'cutaway' view of universal support for a display unit in an exemplary viewing position with extensible tongue member retracted.
Figure 5C:
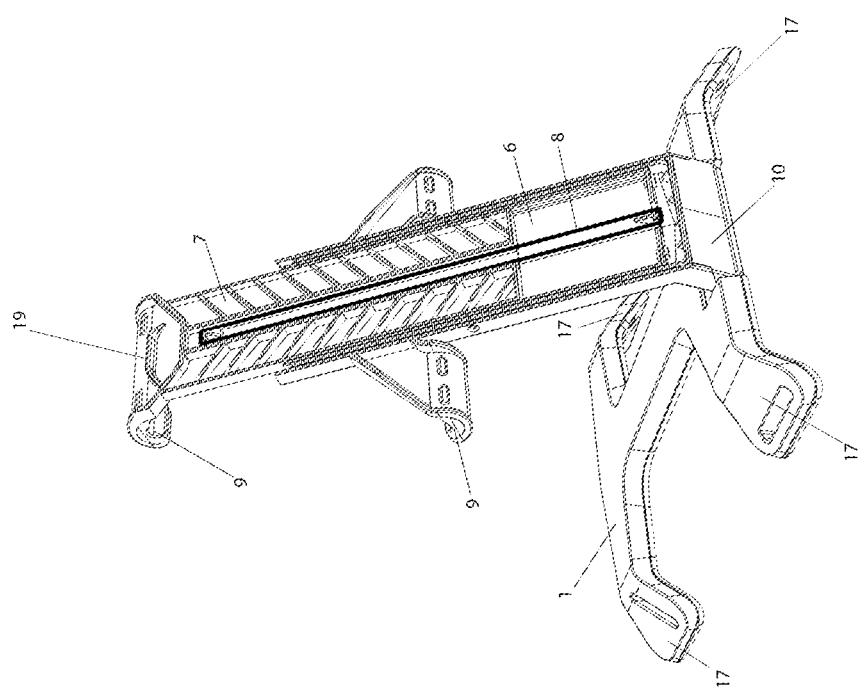
FIG. 5C is a rear perspective 'cutaway' view of universal support for a display unit in an exemplary viewing position with extensible tongue member extended.

Turning to FIGS. 5B and 5C, a stretchable member 8 having a proximal end and a distal end wherein the proximal end is fixedly attached to the cantilever arm 6 and the distal end is fixedly attached to the extensible tongue member 7. A plurality of resiliently deformable gripper members 9 are configured to grasp the display unit when the plurality of gripper members 9 are stretched open by the stretchable member 8. The gripper members 9 may have slotted and space ribs to aid in grasping display units of various shapes and sizes. Further, finger ledge 19 allows the user to better grip the extensible tongue member 7 to ease extension motion of the extensible tongue member 7.

Turning to FIG. 5C, the extensible tongue 7 is moved vertically along the cantilever arm 6 and the stretchable member 8 is stretched such that the gripper members 9 apply force against a display unit (not shown) inserted between the gripper members 9 to hold the display unit in a stable, immobile position.

Figure 6A:
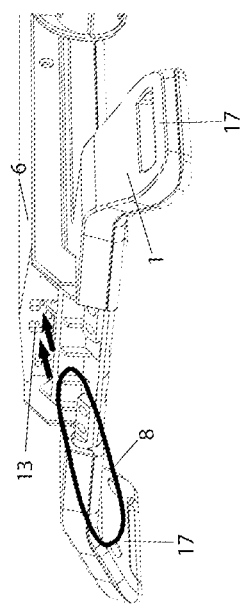
FIG. 6A is a rear perspective view of stretchable member prior to attachment to cantilever arm.
Figure 6B:
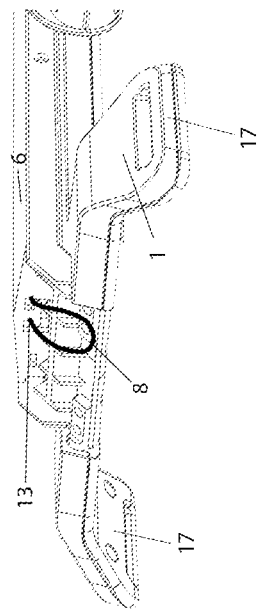
FIG. 6B rear perspective view of stretchable member during attachment to cantilever arm.
Figure 6C:
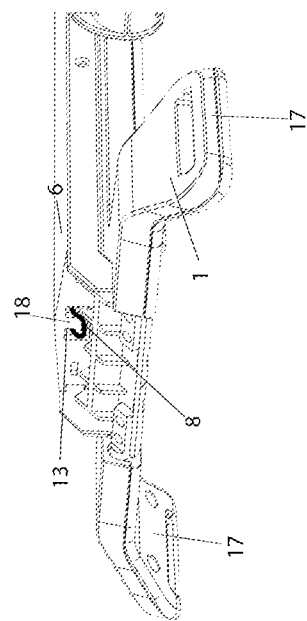
FIG. 6C is a rear perspective view of stretchable member after attachment to cantilever arm.
Figure 7A:
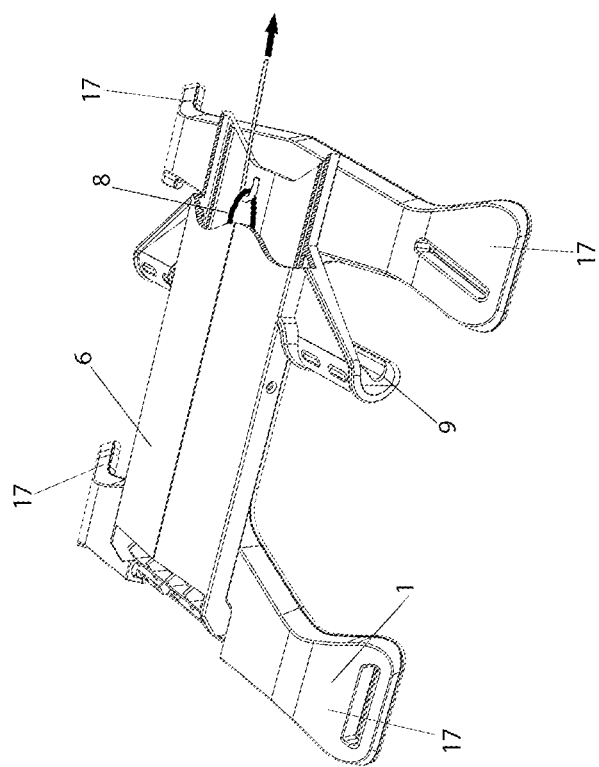
FIG. 7A is a top perspective, cutaway view of stretchable member prior to attachment to extensible tongue member.
Figure 7B:
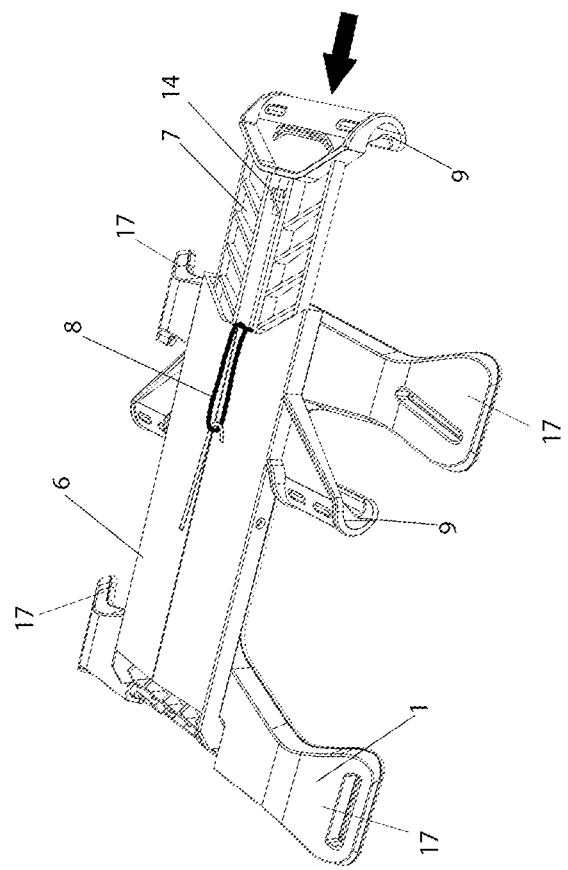
FIG. 7B is a top perspective view of stretchable member during attachment to extensible tongue member.
Figure 7C:
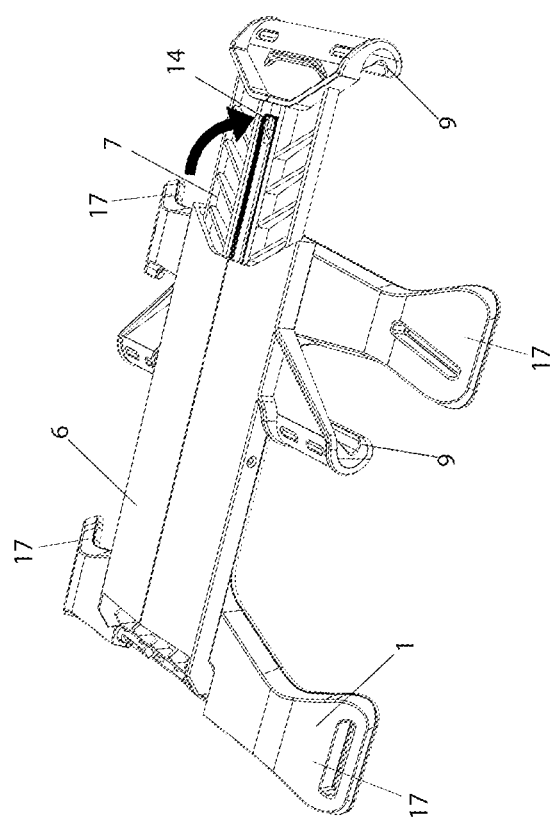
FIG. 7C is a top perspective view of stretchable member after attachment to extensible tongue member.

Turning to FIGS. 6A-6C, the stretchable member 8 is inserted through openings 13 along the cantilever arm 6. Turning to FIGS. 7A-7C, the stretchable member 8 is threaded through opening 13 (not shown) wherein one end of the stretchable member 8 is attached to the cantilever arm 6 at point 18 and the other end of the stretchable member 8 runs through the cantilever arm 6 and is attached to the extensible tongue 7 at attachment point 14 (shown in FIG. 7C).

Figure 8A:
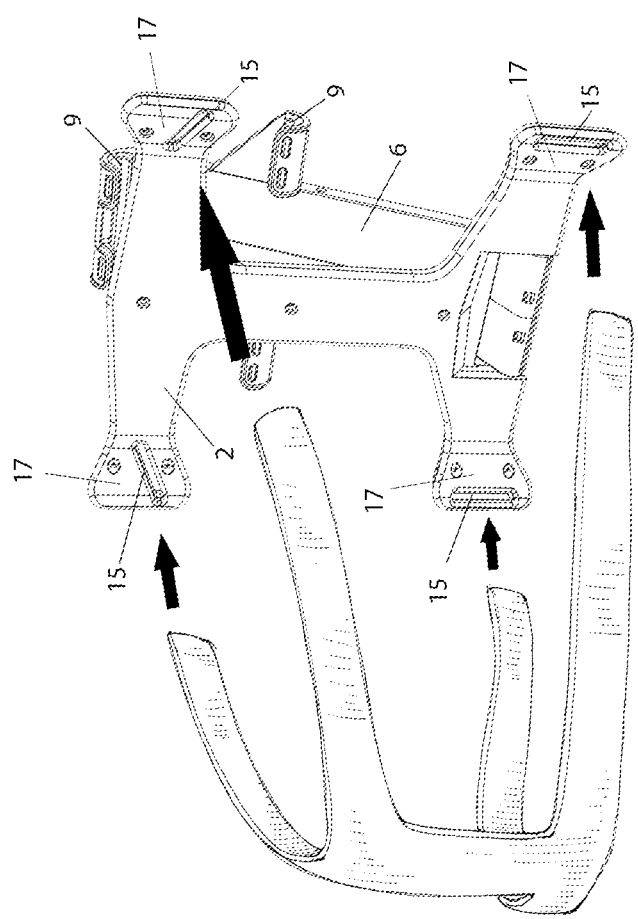
FIG. 8A is a bottom perspective view of universal support for a display unit prior to harness attachment.
Figure 8B:
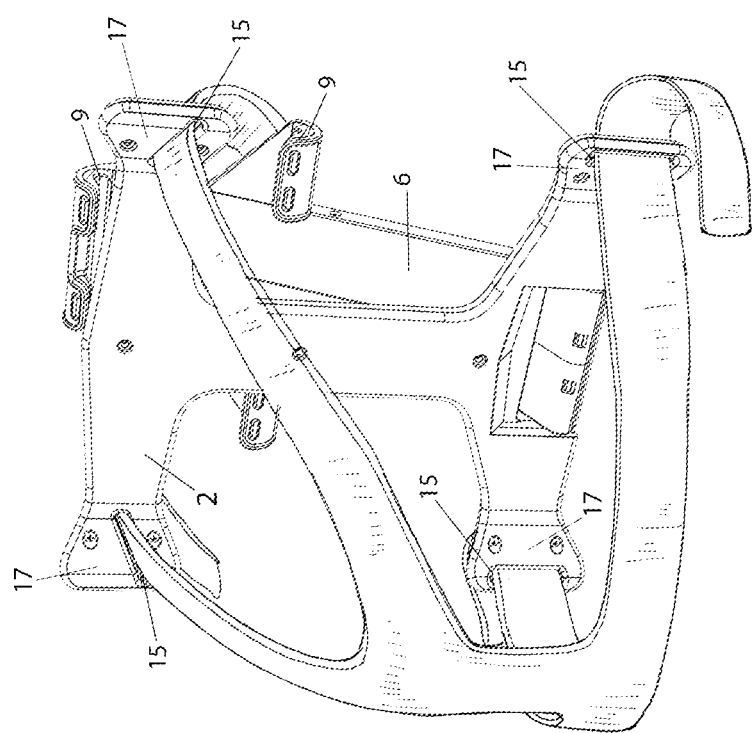
FIG. 8B is a bottom perspective view of universal support for a display unit after harness attachment.
Figure 9:
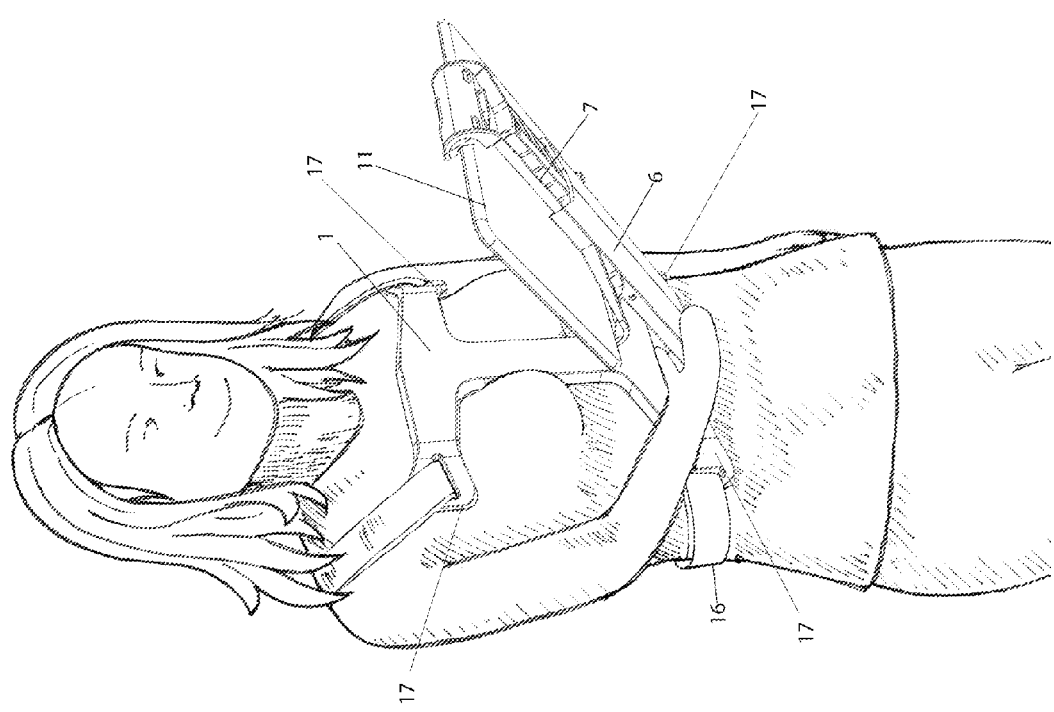
FIG. 9 is a front perspective view of universal support for a display unit when engaged by a user with harness.

As shown in FIG. 8A-8B, an alternative use of the present invention is when the user is standing using a harness configuration. A harness is attached to the footings 17 at a plurality of connection points 15. As shown in FIG. 9, the user 12 may view the display 11 and the top surface of base portion 1 faces away from the user and the footing 17 face towards the user.

Figure 10A:
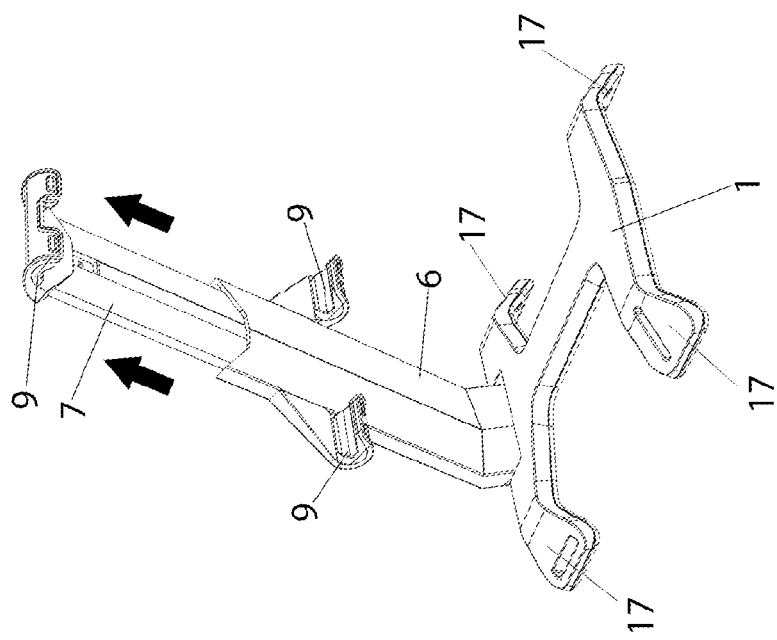
FIG. 10A is a front perspective view of universal support for a display unit extended to accept a display unit between grippers.
Figure 10B:
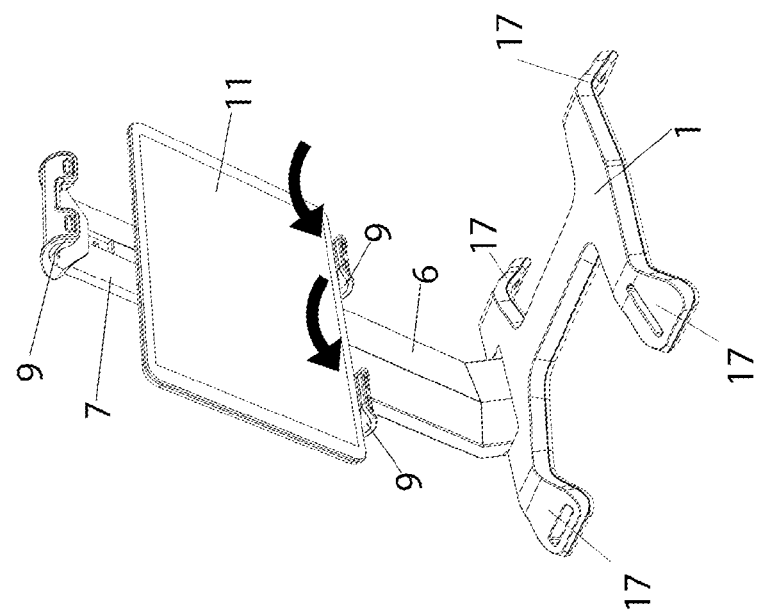
FIG. 10B is a front perspective view of universal support for a display unit with display unit partially inserted between grippers.
Figure 10C:
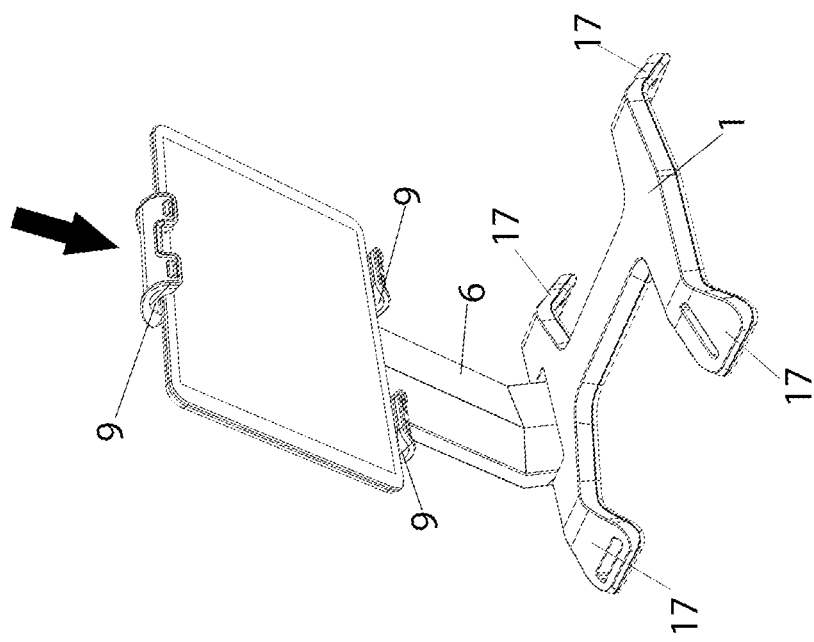
FIG. 10C is a front perspective view of universal support for a display unit with display unit completely inserted between grippers.

As shown in FIGS. 10A-C, a display unit 11 is placed in the holder by moving the extensible tongue 7 vertically along the cantilever arm 6 and the display unit 11 is placed between the grippers 9 and the stretchable member 8 (not shown) is stretched such that the gripper members 9 apply force against a display unit 11 inserted between the gripper members 9 to hold the display unit 11 in a stable, immobile position.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the method (and components of the individual operating components of the method) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A universal support for a display unit comprising:
    a base member wherein the base member is "H" or "I" shaped and configured and sized to fit around the breasts on the chest of a user with a top and a bottom surface and distal outer edges of the "H" or "I" shape;
    a plurality of footings attached at the distal outer edges positioned such that the footings extend downwardly and flare away at least 90 degrees from the base member and wherein the footings have a top side and bottom side;
    a plurality of friction hinges; a rotatable cantilever arm; and wherein the rotatable cantilever arm is rotatably attachable to the base member using the plurality of friction hinges such that the cantilever arm may be rotated around the base member up to about 360 and the base member top surface and footings may face up or down, depending on the position of the cantilever arm.

2. The universal support for a display unit of claim 1 wherein the rotatable cantilever arm is attached to the base member with the plurality of friction hinges such that the cantilever arm may be rotated around the base member up to about 315° and the cantilever arm may be fixed at any point in between 0 and about 315°.

3. The universal support for a display unit of claim 1 further comprising an extensible tongue member wherein the extensible tongue member is attachable to the rotatable cantilever arm such that the extensible tongue member is vertically movable and adjustable along the cantilever arm.

4. The universal support for a display unit of claim 3 further comprising a stretchable member having a proximal end and a distal end wherein the proximal end is fixedly attached to the cantilever arm and distal end is fixedly attached to the extensible tongue member.

5. The universal support for a display unit of claim 4 further comprising a plurality of resiliently deformable gripper members configured to grasp the display unit wherein the plurality of gripper members are stretched open by the stretchable member.

6. The universal support for a display unit of claim 5 wherein the gripper members are comprised of slotted and spaced ribs configured for grasping a variety of shapes and sizes of the display unit.

7. The universal support for a display unit of claim 5 wherein the gripper members are comprised of a semi-rigid material.

8. The universal support for a display unit of claim 1 further comprising a harness wherein the harness is configured and sized such that the bottom surface of the base member is held against the chest of the user.

9. A method for reversibly mounting a display system, the method comprising:

(a) mounting the display on a universal support for a display comprising:
a base member configured and sized to fit around the breasts on the chest of a user with a top and a bottom surface and distal outer edges of the "H" or "I" shape;
a plurality of footings attached at the distal outer edges positioned such that the footings extend downwardly and flare away at least 90 degrees from the base member and wherein the footings have a top side and bottom side;
a plurality of friction hinges; a rotatable cantilever arm; and
wherein the rotatable cantilever arm is rotatably attachable to the base member using the plurality of friction hinges such that the cantilever arm may be rotated around the base member up to about 360°;

(b) adjusting the cantilever arm of the universal support for a display in a first fixed point between about 0 to about 315° such that the base member top surface faces up and footings bottom side faces down; and (c) adjusting the cantilever arm of the universal support for a display in a second fixed point between about 0 to about 315° such that the base member top surface faces down and footings bottom side faces up.

10. The method of claim 9 further comprising adjusting a harness for a third fixed point between about 0 to about 315° wherein the harness is configured and sized such that the bottom surface of the base member is held against the chest of the user.

* * * * *